United States Patent Office 3,379,724
Patented Apr. 23, 1968

3,379,724
3-(AMINOMETHYL)CYCLOBUTANONES
James C. Martin, Kingsport, Tenn., assignor to Eastman Kodak Company, Rochester, N.Y., a corporation of New Jersey
No Drawing. Filed July 23, 1965, Ser. No. 474,492
15 Claims. (Cl. 260—247.7)

ABSTRACT OF THE DISCLOSURE

Substituted 3 - (aminomethyl)cyclobutanones are prepared by contacting a ketoketene with a substituted allylamine at a temperature of about 20° C. to about 200° C. The substituted 3-(aminomethyl)cyclobutanones are useful, for example, as bactericidal agents and as chemical intermediates for the production of useful chemical compounds such as plasticizers and emulsifying agents.

DISCLOSURE

This invention relates to novel substituted 3-(aminomethyl)cyclobutanones and to methods for their production.

According to this invention, it has been found that by a cycloaddition reaction of ketoketenes with substituted allylamines there can be produced novel and valuable substituted 3-(aminomethyl)cyclobutanones which are useful as plasticizers, emulsifying agents and bactericidal agents.

The process of this invention can be practiced by contacting a ketoketene with a substituted allylamine at a temperature of about 20° C. to about 200° C. The contacting of the reactants is preferably carried out at a somewhat elevated temperature, e.g., from about 70° C. to about 200° C. The cyclobutanone produced by my process can be recovered by distillation or recrystallization.

Although not necessary, a solvent can be employed as the medium in which the reaction can be carried out. Suitable solvents include ethers, esters, nitriles, aromatic and aliphatic hydrocarbons, chlorinated hydrocarbons and dipolar aprotic solvents such as dimethylformamide, dimethylsulfoxide, propylene carbonate, tetramethylene sulfone and the like.

Generally, it is preferred to employ the reactants in an approximate molar ratio of 1:1 but an excess of either of the reactants can be employed without detriment.

Among the ketoketenes which are suitable for use in preparing the 3-(aminomethyl)cyclobutanones of the invention are compounds such as: dimethylketene, diethylketene, methylpropylketene, ethylmethylketene, butylethylketene, dibutylketene, dihexylketene, dioctylketene, pentamethyleneketene. diphenylketene, methylphenylketene, and the like. The allylamines which may be employed in practicing this invention include such specific compounds as:

4-allylmorpholine,
N-allylpiperidine,
N-allylpyrrolidine
N-allyl-3-azabicyclo[3.2.2]nonane,
1-allyl-4-methylpiperazine,
N,N-dimethylallylamine,
N,N-diethylallylamine,
N,N-dibutylallylamine,
N-methyl-N-phenylallylamine,
4-methallylmorpholine,
N-methallylpyrrolidine,
N-methallylpiperidine,
N,N'-dimethylmethallylamine,
N-(2-butenyl)piperidine,
4-(2-butenyl)morpholine,
N-(2-pentenyl)pyrrolidine, and
N-(2-hexenyl)pyrrolidine The following equation illustrating the use of certain preferred reactants illustrates graphically the process and certain preferred novel products of the invention:

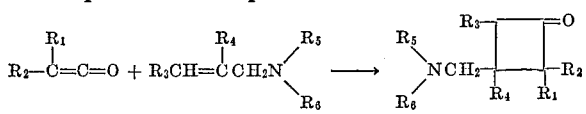

wherein $R_1$ and $R_2$ are alkyl or aryl radicals containing up to about 8 carbon atoms or are alkylene radicals which, with the carbon atom to which they are attached, combine to form a cycloaliphatic ring of 5 to 6 carbon atoms; wherein $R_3$ and $R_4$ are hydrogen or alkyl radicals containing up to about 4 carbon atoms; and wherein $R_5$ and $R_6$ are alkyl or aryl radicals containing up to about 8 carbon atoms or are alkylene radicals which combine with the nitrogen atom to which they are attached to form a heterocyclic ring of 4 to 5 carbon atoms.

In the following examples will be found both graphic and detailed, written description of the application of this invention in the production of representative, specific 3-(aminomethyl)cyclobutanones.

Example 1

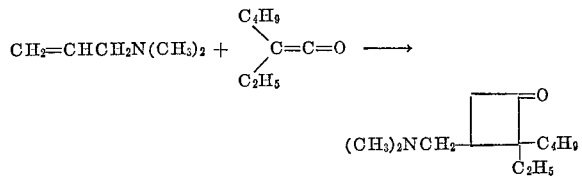

A mixture of 63 g. (0.5 mole) of butylethylketene and 60 g. (0.7 mole) of N,N-dimethylallylamine was heated in an autoclave at 180° C. for 8 hours. The reaction mixture was distilled through an 18-inch Vigreux column to give 34 g. of unchanged N,N-dimethylallylamine and 64 g. of crude product boiling at 80.5–84 (0.5 mm.). The crude product was treated with 10% hydrochloric acid solution and extracted with ether to remove the by-product 2,4 - dibutyl - 2,4 - diethyl-1,3 - cyclobutanedione. The aqueous layer was neutralized with 20% sodium hydroxide solution, extracted with ether and dried over anhydrous magnesium sulfate. Distillation of this solution through a 6-inch Vigreux column gave 34 g. (32%) of 2-butyl-3-(dimethylaminomethyl)-2 - ethylcyclobutanone, B.P. 80°–82° C. (0.6 mm.).

*Analysis.*—Calcd. for $C_{13}H_{25}NO$: C, 74.0; H, 11.8; N, 6.6. Found: C, 73.9; H, 12.2; N, 6.9.

Infrared maximum at $5.64\mu$.

Example 2

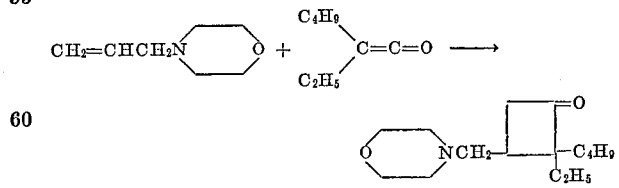

Under the general conditions of Example 1, 63 g. (0.5 mole) of butylethylketene and 83 g. (0.65 mole) of 4-allylmorpholine gave 41 g. (32%) of 2-butyl-2-ethyl-3-(morpholinomethyl)cyclobutanone, B.P. 108°–110° C. (0.1 mm.).

*Analysis.*—Calcd. for $C_{15}H_{27}NO_2$: C, 71.2; H, 10.7; N, 5.5. Found: C, 70.8; H, 10.8; N, 5.7.

Infrared maximum at $5.65\mu$.

Example 3

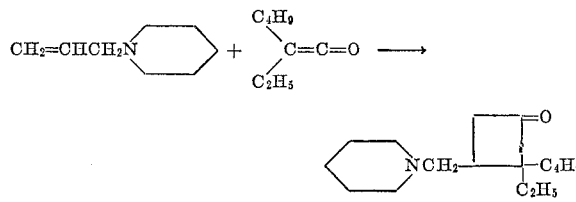

Under the general conditions of Example 1, 63 g. (0.5 mole) of butylethylketene and 83 g. (0.66 mole) of N-allylpiperidine gave 39 g. (31%) of 2-butyl-2-ethyl-3-piperidinomethylcyclobutanone, B.P. 98°–101° C. (0.15 mm.).

*Analysis.*—Calcd. for $C_{16}H_{29}NO$: C, 76.5; H, 11.5; N, 5.6. Found: C, 75.8; H, 11.6; N, 5.8.

Infrared maximum at $5.65\mu$.

Example 4

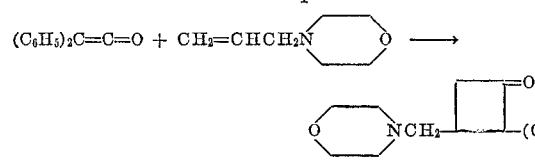

A mixture of 1.27 g. (0.01 mole) of 4-allylmorpholine and 1.94 g. (0.01 mole) of diphenylketene was heated at 70° C. for 20 hours to obtain 3-(morpholinomethyl)-2,2-diphenylcyclobutanone. The infrared spectrum of the resulting viscous product showed a strong band at $5.65\mu$, characteristic of a cyclobutanone.

Example 5

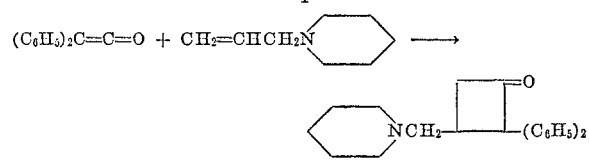

A mixture of 1.25 g. (0.02 mole) of N-allylpiperidine and 1.94 g. (0.01 mole) of diphenylketene was heated at 70° C. for 42 hours to give 2,2-diphenyl-3-(piperidinomethyl)cyclobutanone. The infrared spectrum of the resulting viscous product showed a strong band at $5.65\mu$, charactertistic of a cyclobutanone.

Example 6

$$5\ (CH_3)_2C=C \begin{smallmatrix} O-C \\ \| \\ O \\ \| \\ O-C \end{smallmatrix} C(CH_3)_2 + 2CH_2=CHCH_2N\bigcirc \longrightarrow$$

$$\bigcirc N-CH_2-\underset{(CH_3)_2}{\overset{=O}{\Box}} + CO_2$$

A mixture of 36.8 g. (0.2 mole) of dimethylketene-acylal [H. Bestian and D. Gunther Ang. Chem. internat. Edit., 2, 608 (1963)], 50 g. (0.4 mole) of N-allylpiperidine and 0.1 g. of potassium carbonate is heated at 130°–150° C. for 8 hours. Carbon dioxide is evolved. Distillation through a 6-inch Vigreux column gives 2,2-dimethyl-3-(piperidinomethyl)cyclobutanone in good yield.

Example 7

Under the general conditions of Example 1, the following ketenes and amines give the following products shown:

| Ketene | Allylamine | Product |
|---|---|---|
| $(C_2H_5)_2C=C=O$ | CH₂=CHCH₂N with CH₂-CH₂ ring | NCH₂—cyclobutanone—$(C_2H_5)_2$ with CH₂ groups |
| $(C_4H_9)_2C=C=O$ | $CH_2=\underset{CH_3}{C}CH_2N\bigcirc$ | cyclopentyl-NCH₂—cyclobutanone—$(C_4H_9)_2$ with CH₃ |
| $(C_8H_{17})_2C=C=O$ | $CH_3CH=CHCH_2N(C_2H_5)_2$ | $(C_2H_5)_2NCH_2$—cyclobutanone (CH₃, $C_8H_{17}$)₂ |
| $\underset{iso-C_4H_9}{\overset{C_2H}{>}}C=C=O$ | $CH_2=CHCH_2N\underset{CH_3}{\overset{C_6H_5}{<}}$ | $\underset{CH_3}{\overset{C_6H_5}{>}}NCH_2$—cyclobutanone (iso-$C_4H_9$, $C_2H_5$) |
| $(C_6H_5CH_2)_2C=C=O$ | $CH_2=\underset{C_2H_5}{C}CH_2N(C_4H_9)_2$ | $(C_4H_9)_2NCH_2$—cyclobutanone—$(CH_2C_6H_5)_2$ with $C_2H_5$ |

The bactericidal activity and efficacy of the compounds of this invention was determined in a growth inhibition test in which Staphylococcus aureus was the inhibited organism, well known for its resistance to bactericides. In this test, both the compound of this invention and the bacteria were added to brain-heart infusion broth in a Petri dish and these plates were incubated at 37° C. for 24 hours and then examined for degree of inhibition of growth. At concentrations of 1,000; 250; 63.5; 1.95; and 0.487 microgram per cubic centimeter, respectively, of the following representative compounds of this invention the Staphylococcus aureus bacteria failed to grow:

2-butyl-2-ethyl-3-piperidinomethylcyclobutanone;
2-butyl-2-ethyl-3-morpholinomethylcyclobutanone;
2,2-dimethyl-3-piperidinomethylcyclobutanone.

At the same time as these tests were run, an accompanying control test was also run using ethylhexadecyldimethyl ammonium bromide, employing the same concentrations of this bromide as employed with the materials of this invention. The results were the same, i.e., no growth of the bacteria.

The compounds of the invention are also useful as emulsifying agents and plasticizers and as chemical intermediates. Thus the 3-(aminomethyl)cyclobutanones can be reduced by conventional means, e.g., catalytic hydrogenation, to form 3-(aminomethyl)cyclobutanols. The 3-(aminomethyl)cyclobutanols can be esterified with dicarboxylic acids, e.g., phthalic acid, to form diesters which are useful as plasticizers for vinyl resins, e.g., polyvinyl chloride. The diesters of a 3-(aminomethyl)cyclobutanol with a dicarboxylic acid also react with hydrogen chloride and, therefore, function both as plasticizers and stabilizers when incorporated in a polyvinyl chloride resin.

Although the invention has been described in considerable detail with particular reference to certain preferred embodiments thereof, variations and modifications can be effected within the spirit and scope of the invention as described hereinbefore and as defined in the appended claims.

The embodiments of the invention in which an exclusive property or privilege is claimed are defined as follows:

1. The process which comprises contacting a ketoketene of the formula:

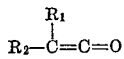

with an allylamine of the formula:

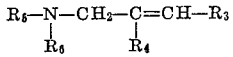

at a temperature of about 20° C. to about 200° C. and obtaining a 3-(aminomethyl)cyclobutanone of the formula:

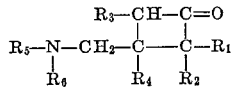

in which $R_1$ and $R_2$, when taken singly, are selected from the group consisting of alkyl of 1 to 8 carbon atoms and aryl of 6 to 8 carbon atoms, and when taken collectively with the carbon atom to which they are attached, represent a member selected from the group consisting of

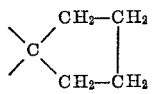

and

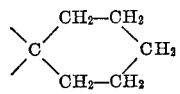

$R_3$ and $R_4$ are selected from the group consisting of hydrogen and alkyl of 1 to 4 carbon atoms; and $R_5$ and $R_6$, when taken singly, are selected from the group consisting of alkyl of 1 to 8 carbon atoms and aryl of 6 to 8 carbon atoms, and when taken collectively with the nitrogen atom to which they are attached, form a heterocyclic ring having 4 to 5 carbon atoms.

2. The process of claim 1 in which the process is carried out at a temperature of about 70° C. to about 200° C.

3. The process of claim 1 in which the ketoketene and the allylamine are contacted in a solvent.

4. The process of claim 3 in which the solvent is a dipolar aprotic solvent and in which the process is carried out at a temperature of about 70° C. to about 200° C.

5. The process which comprises contacting butylethylketene with N,N-dimethylallylamine at a temperature of about 70° C. to about 200° C. and obtaining 2-butyl-3-(dimethylaminomethyl)-2-ethylcyclobutanone.

6. The process which comprises contacting butylethylketene with 4-allylmorpholine at a temperature of about 70° C. to about 200° C. and obtaining 2-butyl-2-ethyl-3-(morpholinomethyl)cyclobutanone.

7. The process which comprises contacting butylethylketene with N-allylpiperidine at a temperature of about 70° C. to about 200° C. and obtaining 2-butyl-2-ethyl-3-(piperidinomethyl)cyclobutanone.

8. The process which comprises contacting diphenylketene with 4-allylmorpholine at a temperature of about 70° C. to about 200° C. and obtaining 3-(morpholinomethyl)-2,2-diphenylcyclobutanone.

9. The process which comprises contacting diphenylketene with N-allylpiperidine at a temperature of about 70° C. to about 200° C. and obtaining 2,2-diphenyl-3-(piperidinomethyl)cyclobutanone.

10. A 3-(aminomethyl)cyclobutanone having the formula:

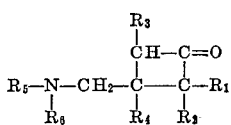

in which $R_1$ and $R_2$, when taken singly, are selected from the group consisting of alkyl of 1 to 8 carbon atoms and aryl of 6 to 8 carbon atoms, and when taken collectively with the carbon atom to which they are attached, represent a member selected from the group consisting of

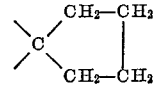

and

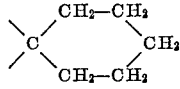

$R_3$ and $R_4$ are selected from the group consisting of hydrogen and alkyl of 1 to 4 carbon atoms; and $R_5$ and $R_6$, when taken singly, are selected from the group consisting of alkyl of 1 to 8 carbon atoms and aryl of 6 to 8 carbon atoms and when taken collectively with the nitrogen atom to which they are attached, form a heterocyclic ring having 4 to 5 carbon atoms.

11. 2-butyl-2-ethyl-3-(piperidinomethyl)cyclobutanone.
12. 2-butyl-2-ethyl-3-(morpholinomethyl)cyclobutanone.
13. 2,2-dimethyl-3-(piperidinomethyl)cyclobutanone.
14. 2-(butyl)-3-(dimethylaminomethyl)-2-ethyl cyclobutanone.
15. 3-(morpholinomethyl)-2,2-diphenyl cyclobutanone.

References Cited
UNITED STATES PATENTS 3,189,608   6/1965   Martin _____ 260—247.7

NICHOLAS S. RIZZO, *Primary Examiner.*

J. TOVAR, *Assistant Examiner.*